United States Patent [19]

Vasconcellos et al.

[11] Patent Number: 5,169,536

[45] Date of Patent: Dec. 8, 1992

[54] DETOXIFICATION AGENTS FOR SURFACTANT BASED BIOCIDES

[75] Inventors: Stephen R. Vasconcellos, Doylestown, Pa.; Larry A. Lyons, Woodbury, N.J.; Michael F. Mohn, Levittown, Pa.

[73] Assignee: Betz Laboratories, Inc., Trevose, Pa.

[21] Appl. No.: 874,942

[22] Filed: Apr. 28, 1992

[51] Int. Cl.⁵ .............................. C02F 1/28; C02F 1/68
[52] U.S. Cl. .................................... 210/691; 210/749; 210/764; 210/910
[58] Field of Search ............... 210/691, 749, 764, 910, 210/666, 668

[56] References Cited

U.S. PATENT DOCUMENTS

| | | | |
|---|---|---|---|
| 3,524,812 | 8/1970 | Shema et al. | 210/63 |
| 4,204,954 | 5/1980 | Jacob | 210/59 |
| 4,857,209 | 8/1989 | Lyons et al. | 210/755 |
| 5,008,292 | 4/1991 | Ecsery et al. | 514/654 |

Primary Examiner—Stanley S. Silverman
Assistant Examiner—Cynthia L. Nessler
Attorney, Agent, or Firm—Alexander D. Ricci; Steven D. Boyd

[57] ABSTRACT

The present invention is directed to a method of detoxifying water containing a cationic surfactant based biocide. The method comprises adding to an aqueous stream including a biocide containing cationic surfactants a sufficient quantity of a combination including clay and a non surface active sulfonate such as a polymerized alkyl naphthalene sulfonate. The combination allows for a high solids detoxification treatment.

9 Claims, No Drawings

5,169,536

DETOXIFICATION AGENTS FOR SURFACTANT BASED BIOCIDES

FIELD OF THE INVENTION

The present invention relates to the detoxification of surfactant based biocides. More particularly, the present invention relates to a process which employs an aqueous slurry including a bentonite clay and an alkyl naphthalene sulfonate to detoxify an aqueous stream containing surfactant based biocides.

BACKGROUND OF THE INVENTION

The fouling of industrial water systems due to the presence of macroinvertebrates is a constant problem. Whether an industrial water system is a once-through or a recirculating system, the system will be vulnerable to contamination by macroinvertebrates. The extent and type of macroinvertebrate fouling will depend upon many factors such as the source of the cooling water, the season, the water temperature, the growth rate of the fouling macroinvertebrate and the linear velocity of the water in the system.

For example, mollusks are common macroinvertebrates which can cause macrofouling problems to marine and fresh water cooling systems. Macrofouling by mollusks, like other groups of macrofouling microinvertebrates—barnacles, bryozoans, sponges, hydroids, trunicates and annelids—is initiated by the settlement or attachment of larval and or juvenile stages that are easily entrained by the surface waters of cooling systems. Fouling caused by the settlement, attachment and/or growth of the mollusks in the cooling system and associated service water systems of industrial plants and utilities which utilize large quantities of water is a major problem causing a variety of deleterious effects to the structure, operation and safety of the systems.

The growth of microbiological contaminants in industrial water systems is a similar problem. The formation of slime by microorganisms is a problem in both cooling water systems and pulp and paper mill systems. In those once-through and recirculating cooling systems which employ large quantities of water as a cooling medium, the formation of slime by microorganisms is an extensive and constant problem.

Because of the problems attendant with the presence of macroinvertebrates, slime or microorganism growth the use of controlling biocides is common. Biocides, such as quaternary ammonium salts have proven to dramatically increase system efficacy by creating an uninhabitable environment for the macroinvertebrates or the microorganisms. For example, U.S. Pat. No. 4,857,209 described a method of controlling the fouling potential of macroinvertebrates such as mollusks in aqueous systems which employs a water soluble quaternary ammonium salt. The water streams from cooling towers and other industrial water systems that are treated by such biocides may contain residual amounts of the material upon release into the natural environment. Such release may result in the death of fish or other wildlife.

Concerns with respect to such discharge of waste products into natural waters has grown significantly in recent years. This growing concern is manifested, in part, in the actions of municipal, state and federal authorities who have either already enacted legislation to eliminate the pollution of our natural waters or who are in the process of promulgating such regulations. The regulations and legislations enacted by representative authorities are becoming more and more stringent with the ultimate goal being the prohibition of the addition of any material to natural water which has even an insignificant effect on the life which exists therein.

In response to such legislation, industrial users of large volumes of water have sought out methods of decreasing effluent toxicity. See for example U.S. Pat. No. 3,524,812 which teaches a method of decreasing the biocidal effects of bromonitrostyrene by reaction with a compound selected from a water soluble sulfite compound, hydrogen peroxide and potassium permanganate. U.S. Pat. No. 4,204,954 teaches a method of detoxifying residuals of quaternary ammonium salt biocides in water by neutralizing with anionic monomers such as sodium stearate.

The addition of clays to waters treated with quaternary ammonium salt biocides prior to release into the environment is known. Such materials, particularly bentonite clay, have been shown in laboratory and field tests to be effective at detoxifying quaternary ammonium compounds thereby avoiding wildlife kills. While clays have been shown to be effective treatments for the detoxification of biocides they are troublesome to feed, particularly during moist or rainy weather.

As a partial solution to these feeding problems water based slurries containing clay have been developed. The feeding of an aqueous slurry of clay is relatively problem free, however, such clay slurries are limited to approximately 23% active levels by viscosity and stability limitations. The limited actives level (about 23%) in such slurries results in increased costs for shipping and handling due to the large volume of water present. Prior to the present invention, the use of a "high solids" clay based slurry for quaternary ammonium based biocide detoxification was unknown. By "high solids" content it is meant actives level in an aqueous slurry above 23% and preferably up to about 50% or higher.

SUMMARY OF THE INVENTION

The present invention provides a method of detoxifying biocides containing cationic surfactants such as quaternary ammonium salts (quat) and dodecylguanidine hydrochloride (DGH) in aqueous systems. The method involves adding, to an aqueous stream containing residual biocides, an aqueous slurry containing clay and an alkyl napthalene sulfonate. The aqueous slurry can contain up to about 50% active ingredients without exhibiting a viscosity which prevents efficient handling and application. The ratio of clay to sulfonate can range from about 3:1 to 1:3. The slurry preferably includes stabilizers and viscosity modifiers such as polyacrylic acid and copolymers of polyacrylic acid and maleic acid.

The slurry combination of the present invention provides a higher solids (also referred to herein as actives) concentration then prior art clay slurries. The viscosity of the high solids slurries of the present invention are easily handled by conventional application equipment. Both primary components of the combination are active detoxifying agents for the cationic surfactants. The slurry combinations, being a high solids slurry, reduce treatment costs by greatly reducing the volume of the treatment necessary to detoxify a given concentration of surfactants. Further, the alkyl naphthalene sulfonate component in addition to detoxifying surfactants also acts as a dispersant which inhibits settling of the detoxified material. Rapid settling of the detoxified material at an out flow point could result in the formation of a large sludge pile. There is some concern that over time, it may be possible for the surfactant based biocide in such a sludge pile to reach active concentrations. Thus, the dispersant effect of the treatment of the present invention is highly desirable. By dispersing the detoxified surfactant based biocide using the clay/sulfonate treatment, the present invention minimizes the possibility of a treated material build-up in a specific location.

DESCRIPTION OF THE PREFERRED EMBODIMENT

The present inventors discovered that a combination of clay and a sulfonate can effectively neutralize the toxicity o cationic surfactant based biocides. The combination allows for the formation of a high solids, relatively low viscosity aqueous slurry which greatly reduces the volume of detoxifying agent required for a given concentration of surfactant. The sulfonate of the present invention, in addition to acting as a detoxifying agent was found to allow the formation of a high solids slurry with relatively low viscosity. The sulfonate of the present invention is a high molecular weight, greater than about 10,000 daltons. The sulfonate is not a surface active agent; that is, it does not significantly effect the surface tension of water.

The high solids nature of the present invention allows for a reduced volume of slurry to be employed per volume of biocide to be detoxified. This results in a savings in shipping costs and in handling and pumping costs. The aqueous slurry of the present invention can have an active solids level of over 50% yet still have a viscosity sufficiently low so as to allow efficient pumping and handling. In contrast, for a prior art clay slurry 23% was the maximum actives level which was acceptable from a handling/ pumping standpoint. To further enhance (lower) the viscosity of the combination of the present invention as well as increase stability, conventional additives may be added. For example a low molecular weight (about 5000 daltons) polyacrylic acid can be added in amounts up to about 10% to lower the viscosity of the slurry. A low molecular weight (about 5000 daltons) copolymer of polyacrylic acid and maleic acid can be added in amounts up to about 5% to lower the viscosity of the slurry. Triethylanolamine can be added in amounts up to about 5% to stabilize the slurry during storage and shipping. Table 1 summarizes viscosity and stability (reported as percent separation) for a variety of concentrations of clay as well as combinations within the scope of the present invention. The results show the relatively low viscosity and good stability of the combinations of the present invention.

In addition, it was discovered that the combination of the present invention exhibited a reduced volume in comparison to a prior art clay slurry (23% clay). That is, for a given weight of clay/sulfonate of the present invention, there was a volume reduction relative to a 23% clay slurry. This will result in a savings in shipping and handling containers.

TABLE 1

| Viscosity and Stability of Aqueous Clay Slurries | | |
|---|---|---|
| Blend Composition (In Distilled Water) | Viscosity (cp) | Separation (%) |
| 10% clay | 4020 | — |
| 15% clay | >50000 | — |

TABLE 1-continued

| Viscosity and Stability of Aqueous Clay Slurries | | |
|---|---|---|
| Blend Composition (In Distilled Water) | Viscosity (cp) | Separation (%) |
| 20% clay | >50000 | — |
| 10% clay/10% alkyl napthalene sulfonate | 453 | 4.5 |
| 20% clay/15% alkyl napthalene sulfonate | 1900 | 1.7 |
| 30% clay/15% alkyl napthalene sulfonate | 17400 | 1.5 |
| 34% clay/17% alkyl napthalene sulfonate | 22000 | 1.5 |
| 34% clay/17% alkyl naphthalene sulfonate 6% polyacrylic acid/4% triethanolamine | 2140 | 11.3 |
| 34% clay/17% alkyl naphthalene sulfonate 6% polyacrylic acid/2% triethanolamine | 3860 | 4.5 |
| 38% clay/19% alkyl napthalene sulfone 6% polyacrylic acid/2% triethanol amine | 7230 | 1.5 |
| 38% clay/19% alkyl naphthalene sulfonate 3% polyacrylic acid/maleic acid copolymer 1% triethanol amine | 6260 | 1.6 |

Jar testing was conducted to assess the detoxification activity of clay, alkyl naphthalene sulfonate, and a combination of the two. In the testing, 50 parts per million of each treatment was added to distilled water containing 25 parts per million of a cationic surfactant based biocide. The surfactant based biocide was composed of two cationic surfactants—Quat (alkyldimethylbenzyl ammonium chloride) and DGH (dodecylguanidine hydrochloride). The concentration of residual biocide after 15 minutes was measured. Table 2 summarizes the results and shows the effectiveness of the combination of the present invention.

TABLE 2

| Detoxification Effects | |
|---|---|
| Treatment | Residual biocide (ppm) |
| Control | 23.61 |
| 50 ppm bighorn bentonite clay | 1.82 |
| 50 ppm bentonite/alkyl napthalene sulfonate (75/25) | 4.20 |
| 50 ppm bentonite/alkyl napthalene sulfonate (50/50) | 5.65 |
| 50 ppm bentonite/alkyl napthalene sulfonate (25/75) | 5.82 |
| 50 ppm alkyl naphthalene sulfonate | 5.97 |

Static acute bioassays were conducted with aqueous solutions of bentonite clays and the combination of the present invention using Daphnia Magna and fathead minnows. Tables 3, 4 and 5 summarize the results. The results in Table 4 show that in the detoxification of 10 ppm biocide, 5 ppm of clay/sulfonate has an advantage over 5 ppm clay alone.

TABLE 3

| Detoxification Study using 2/1 Clay/Sulfonate Blend Test Organism: Daphnia Magna | | |
|---|---|---|
| | % Cumulative Mortality | |
| Treatment | 24 hr | 48 hr |
| Control | 0 | 0 |
| 10 ppm biocide | 100 | 100 |
| 150 ppm clay/sulfonate (2:1 blend) | 0 | 0 |
| 10 ppm biocide + 15 ppm clay/sulfonate (2:1 blend) | 65 | 100 |
| 10 ppm biocide + 45 ppm clay/sulfonate (2:1 blend) | 0 | 0 |
| 10 ppm biocide + 75 ppm clay/sulfonate (2:1 blend) | 0 | 0 |
| 10 ppm biocide + 150 ppm clay/sulfonate (2:1 blend) | 0 | 0 |

Additional static acute bioassays were conducted in aqueous solutions with varying concentrations of the individual components and the combination of the present invention using fathead minnows. Table 4 summarizes the results. As can be seen in Table 4 the combination of the present invention is an effective detoxifying agent at concentrations which are less viscous and more easily handled than prior art clay slurries or bulk clay.

TABLE 4

Detoxification Study at Varying Treatment Rates
Test Organism: Fathead Minnows

| Treatment | % Cumulative Mortality | | | | |
|---|---|---|---|---|---|
| | 17 hr | 24 hr | 48 hr | 72 hr | 96 hr |
| Control | 0 | 0 | 0 | 0 | 0 |
| 10 ppm biocide | 100 | 100 | 100 | 100 | 100 |
| 20 ppm Clay | 0 | 0 | 0 | 0 | 0 |
| 30 ppm Clay/sulfonate (2/1) | 0 | 0 | 0 | 0 | 0 |
| 20 ppm sulfonate | 0 | 0 | 0 | 0 | 0 |
| 10 ppm biocide + 2.5 ppm clay | 100 | 100 | 100 | 100 | 100 |
| 10 ppm biocide + 3.75 ppm clay/sulfonate (2/1) | 0 | 0 | 20 | 20 | 20 |
| 10 ppm biocide + 2.5 ppm sulfonate | 100 | 100 | 100 | 100 | 100 |
| 10 ppm biocide + 5 ppm clay | 60 | 60 | 60 | 100 (80 hr) | 100 |
| 10 ppm biocide + 7.5 ppm clay/sulfonate (2/1) | 20 | 20 | 20 | 40 | 40 |
| 10 ppm biocide + 5 ppm sulfonate | 100 | 100 | 100 | 100 | 100 |
| 10 ppm biocide + 10 ppm clay | 0 | 0 | 0 | 20 | 20 |
| 10 ppm biocide + 15 ppm clay/sulfonate (2/1) | 0 | 0 | 20 | 20 | 20 |
| 10 ppm biocide + 10 ppm sulfonate | 40 | 40 | 40 | 40 | 40 |
| 10 ppm biocide + 20 ppm clay | 0 | 0 | 0 | 0 | 0 |
| 10 ppm biocide + 30 ppm clay/sulfonate (2/1) | 0 | 0 | 0 | 0 | 0 |
| 10 ppm biocide + 20 ppm sulfonate | 0 | 0 | 0 | 0 | 0 |

Note: in above testing sulfonate was sodium naphthalene sulfonate

Testing was also undertaken with aqueous solutions of sodium lignosulfonate (Norlig G available from American Can Company of Greenwich, Conn.) in combination with bentonite clay. Tables 5 and 6 summarize the results and show the detoxification effects of the present invention. Table 5 and 6 show that naphthalene sulfonate is more beneficial at lower dosages than lignosulfonate.

TABLE 5

Detoxification using Sodium Lignosulfonate
and Bentonite at 1 to 1 ratio
Test Organism: Fathead Minnows

| Treatment | % Cumulative Mortality | | | |
|---|---|---|---|---|
| | 24 hr | 48 hr | 72 hr | 96 hr |
| Control | 0 | 0 | 0 | 0 |
| 10 ppm biocide | 100 | 100 | 100 | 100 |
| 10 ppm Clay/lignosulfonate | 0 | 0 | 0 | 0 |
| 10 ppm biocide + 5 ppm Clay/lignosulfonate (1:1) | 100 | 100 | 100 | 100 |
| 10 ppm biocide + 10 ppm Clay/Lignosulfonate (1:1) | 100 | 100 | 100 | 100 |
| 10 ppm biocide + 20 ppm Clay/Lignosulfonate (1:1) | 20 | 20 | 20 | 20 |
| 10 ppm biocide + 40 ppm Clay/Lignosulfonate (1:1) | 0 | 0 | 0 | 0 |
| 10 ppm biocide + 60 ppm Clay/Lignosulfonate (1:1) | 0 | 0 | 0 | 0 |

TABLE 6

Detoxification Using Sodium Lignosulfonate and
Bentonite at 1 to 1 ratio
Test Organism: Daphnia Magna

| Treatment | % Cumulative Mortality | |
|---|---|---|
| | 24 hr | 48 hr |
| Control | 0 | 0 |
| 10 ppm biocide | 100 | 100 |
| 10 ppm lignosulfonate/clay (1:1) | 0 | 0 |
| 10 ppm biocide + 20 ppm lignosulfonate/clay (1:1) | 100 | 0 |
| 10 ppm biocide + 40 ppm lignosulfonate/clay (1:1) | 100 | 0 |
| 10 ppm biocide + 60 ppm lignosulfonate/clay (1:1) | 100 | 0 |
| 10 ppm biocide + 100 ppm lignosulfonate/clay (1:1) | 100 | 0 |

While the present invention has been described with respect to particular embodiments thereof, it is apparent that numerous other forms and modifications of this invention will be obvious to those skilled in the art. The appended claims in this invention generally should be construed to cover all such obvious forms and modifications which are within the true spirit and scope of the present invention.

What is claimed is:

1. A method of detoxifying water containing a cationic surfactant based biocide that comprises adding thereto at least a neutralizing amount of an aqueous slurry containing a combination of a bentonite clay and a polymerized alkyl naphthalene sulfonate sodium salt in a ratio of from about 1:3 to about 3:1.

2. The method of claim 1 wherein said cationic surfactant based biocide is a combination of a biocidal quaternary ammonium salt and dodecylguanidine hydrochloride.

3. The method of claim 2, wherein said biocidal quaternary ammonium salt is alkyldimethyl benzylammonium chloride.

4. A process for significantly decreasing the toxic effects of a cationic surfactant based biocide in an aqueous solution which comprises adding thereto a sufficient quantity for the purpose of an aqueous slurry containing a combination of a bentonite clay and a polymerized alkyl naphthalene sulfonate sodium salt in a ratio of from about 1 to 3 to about 3 to 1.

5. The process of claim 4, wherein said cationic surfactant based biocide is a combination of biocidal quaternary ammonium salts and dodecylguanidine hydrochloride.

6. The process of claim 5, wherein said biocidal quaternary ammonium salt is alkyldimethylbenzyl ammonium chloride.

7. A method of detoxifying water containing a biocidal quaternary ammonium salt that comprises adding thereto at least a neutralizing amount of an aqueous slurry containing a combination of a bentonite clay and a non surface active sulfonate having a molecular weight above about 10,000, in a ratio of from about 1:3 to about 3:1.

8. The method of claim 7, wherein said cationic surfactant based biocide is a combination of biocidal quaternary ammonium salts and dodecylguanidine hydrochloride.

9. The method of claim 8, wherein said biocidal quaternary ammonium salt is alkyldimethylbenzyl ammonium chloride.

* * * * *